April 8, 1924.
A. F. ROGER
1,489,549
TOOL HOLDER
Filed Sept. 5, 1922
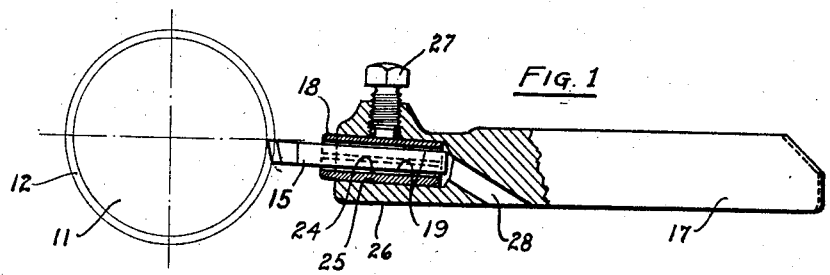
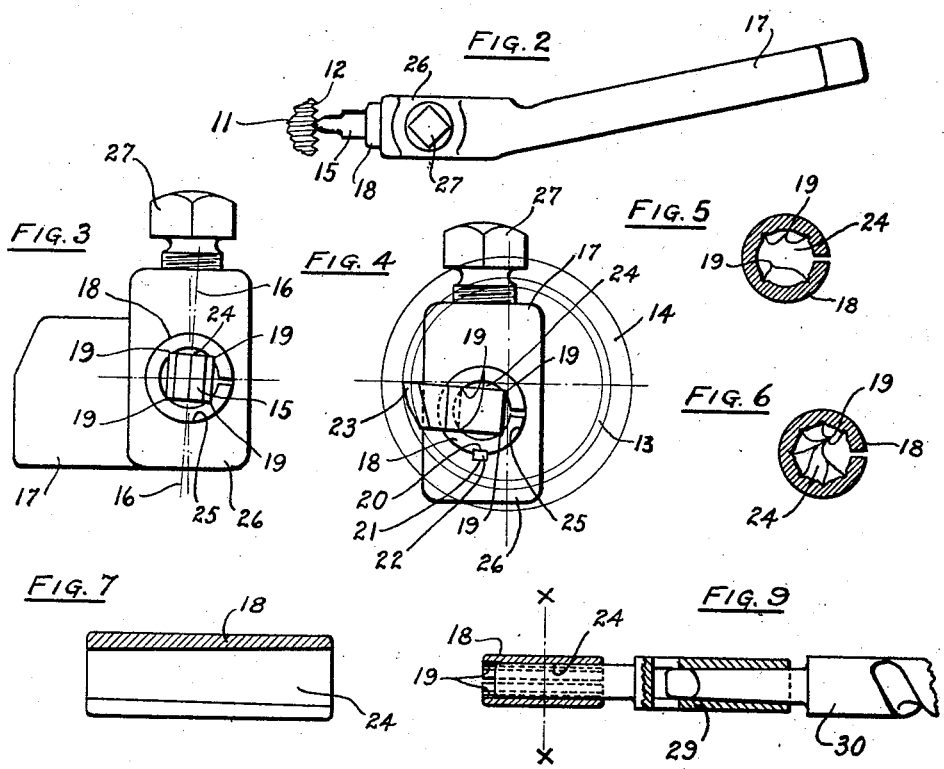
INVENTOR
Adolph Felix Roger
BY
Wm G. P homstran.
ATTORNEY

Patented Apr. 8, 1924.

1,489,549

UNITED STATES PATENT OFFICE.

ADOLPH FELIX ROGER, OF MAYWOOD, ILLINOIS.

TOOL HOLDER.

Application filed September 5, 1922. Serial No. 586,262.

*To all whom it may concern:*

Be it known that I, ADOLPH FELIX ROGER, a citizen of the United States, residing at Maywood, in the county of Cook and State of Illinois (whose post-office address is No. 2036 South Fourth Avenue, Maywood, Illinois), have invented certain new and useful Improvements in Tool Holders, of which the following is a specification.

My invention relates to improvements in tool holders such as are used to hold machining tools for machining material in machine tools, such as lathes, shapers, planers and the like; and the objects of my improvements are, to provide a laterally bent tool holder bar having a longitudinal bore in the end of the laterally bent portion thereof to receive therein a longitudinally split bushing which is adapted to receive therein the tool, or an auxiliary tool holder, such, as a drill, reamer, or other tool holder socket; and, to provide means for rigidly securing the tool, or the auxiliary tool holder, in the tool holder bushing; and to provide a knock-out hole in the body of the laterally bent tool holder through which may be inserted a knock-out pin for removing the said bushing, or tools, etc., which may have, for some reason or other, become stuck and otherwise difficult to remove; and, to provide a longitudinally split bushing having its hole therethrough provided with, preferably, longitudinal square corners to receive the square body portion of thread cutting tools, boring tools, and the like. The outside diameter of the bushing being circular permits of turning same with the cutting tool (thread cutting tool for instance) therein, to any desired angle, or the thread angle. And, to provide a laterally bent tool holder bar which shall be only slightly bent so that it may be used either, as what is known, as a right, or left hand off-set tool. Should the opposite hand for which the tool holder is made be desired, the body of the tool itself may be slightly bent so as to accommodate the conditions.

These and other objects of my improvements will be manifest and more clearly pointed out in the accompanying drawings, specifications and appended claims.

In the accompanying drawings:—

Figure 1, is a side elevation of the toolholder embodying my improvements, and parts thereof being broken away and shown in section to more clearly show the several parts. The cutting tool is shown in position against the work.

Figure 2, is a plan view of Figure 1.

Figure 3, is an enlarged end view of Figure 1, showing my improvement as used to cut screw threads on the work shown in Figure 1.

Figure 4, is an end view somewhat similar to that of Figure 3, but showing locating key for bushing for maintaining permanent position of bushing and tool while boring, or, cutting internal screw threads.

Figure 5, is a sectional view of the toolholder bushing showing a preferable cross section thereof.

Figure 6, is a sectional view of the toolholder bushing showing a modification of the cross section as shown in Figure 5.

Figure 7, is a longitudinal sectional view of the tool-holder bushing having a tapered hole therein to receive taper shanked tools.

Figure 8, is an end view of the toolholder bushing showing an eccentric hole therethrough.

Figure 9, is an assembled view of the tool-holder bushing, a drill socket, and a portion of a taper shank drill.

Figure 10, is an enlarged sectional view through the tool-holder bushing on line X—X of Figure 9, and shows a round section therein.

Similar characters refer to similar parts throughout the several views.

In Figures 1, 2, 3 and 4 will be seen the adaption of my improvements as utilized when cutting screw-threads, 11, on the work, 12, which is, in Figure 11 represented by two light concentric circles, and, in Figure 4, by three concentric circles, two of which represent internal screw-threads, 13, in the cylinder, or tube 14. In Figure 3, the thread cutting tool, 15, is shown inclined to correspond to the lead angle of the screw-thread, as indicated by the slanting line, 16, which it is assumed to be cutting. The tool-post for holding the tool-holder, 17, is not shown. In all the Figures 1 to 10 inclusive are shown the tool-holder split bushings, 18, which are all similar as to outside contour, or diameter, but the hole, or bore, through the bushing is made to suit, or conform to, the tool which is to be held therein, as is clearly shown in Figures 1, 3 and 4, as at, 19. The longitudinal notches, 19, of the bushing 18, are intended to prevent any slight angular turning of the tool, 15; and, as will be seen in Figure 4, key ways 20 and 21, respectively of the split bushing, 18, and the tool-holder, 17, are provided, and, into which, a key, 22, is driven. By this means together with the notches, 19, the tool, 23, and the split bushing, 18, are positively held from turning, thereby eliminating all danger of marring, or spoiling the work.

The tool, whatever it may be, is inserted into the hole, 24, of the tool-holder split-bushing, 18, and it, the bushing, 18, together with the tool, for instance, 15, or as is shown in Figure 4, with the tool, 23, is inserted into the bore 25, of the laterally bent portion, 26, of the tool-holder, 17, set to the required angle of the screw thread to be cut, as is shown in Figures 2 and 3, or, as is shown in Figure 4, and clamped securely together and in place by the clamping screw, 27. Referring to Figure 1, will be seen an inclined hole, 28, leading to the bottom end of the bore, 25, and so located as to permit of inserting a knock-out pin for knocking out the tool or bushing should they have become stuck for some reason or other.

In Figure 7, the hole, 24, is shown tapered to receive therein taper shank drills, reamers, or the like. While in Figure 8, the hole, 24, is shown eccentric; this feature permits of obtaining various adjustments for the tool to secure the desired cutting position thereof. And, in Figure 9, will be seen means for securing a various assortment of tools in the tool-holder split-bushing, 18, through the medium of a tool-holder socket, 29, into which is shown a taper shank drill, 30.

Having thus described my invention, the merits of my improvements can be readily understood, and it will be seen that the minor details of my construction may be altered without departing from the spirit of my invention, and what I claim and desire to secure by Letters Patent is—

1. The combination in a slightly laterally bent tool-holder bar, a main tool-holder body having a short portion thereof bent laterally at a slight angle from the main body portion, a slightly inclined longitudinal bore in the laterally bent portion thereof, a longitudinally split tool-holder bushing adapted to be received in said bore, and said bushing adapted to receive therein the shank or body portion of a various assortment of tools, means in the said laterally bent portion of the main tool-holder body for clamping the said bushing against the tool and into the said bore of the said laterally bent portion, a knock-out hole in said main tool-holder body leading to the bottom of said slightly inclined bore in said laterally bent portion of the bar.

2. In combination with a laterally bent tool-holder bar, a longitudinally split tool-holder bushing adapted to receive various shaped tool shanks, such as square, or round shanks, or tapered shanks, therein; means for adjustably securing the said tool-holder bushing together with the tool, or the tool-holder, in any desired angle therein in the said tool-holder bar, and means in the laterally bent portion of the said bar for rigidly clamping the said bushing, the tool, or the tool-holder, therein, together into the slightly inclined longitudinal hole in the end of the laterally bent portion of said tool-holder bar.

3. In combination with a laterally bent tool-holder bar, a longitudinally split eccentric tool holder bushing adapted to adjustably receive round tool shanks in the eccentric hole thereof, means in the bent portion of said bar for rigidly clamping the said bushing and the tool therein together into a slightly inclined longitudinal hole in the end of the laterally bent portion of said tool-holder bar.

ADOLPH FELIX ROGER.

Witnesses:
ROBT. B. HAINSWORTH,
E. L. BLOMSTRAN.